United States Patent [19]

Jacobi et al.

[11] Patent Number: 4,500,874
[45] Date of Patent: Feb. 19, 1985

[54] FILTER MONITORING SYSTEM

[75] Inventors: Stephen F. Jacobi, Cedar Falls; Robert E. Haight, Waterloo; John W. Schletzbaum, Hudson; Yolanda E. Martin, Cedar Falls; Stephen P. Lang, Waterloo, all of Iowa

[73] Assignee: Deere & Company, Moline, Ill.

[21] Appl. No.: 378,703

[22] Filed: Jun. 17, 1982

[51] Int. Cl.³ .............................................. G08B 21/00
[52] U.S. Cl. ............................. 340/607; 116/DIG. 42
[58] Field of Search ............... 340/607; 116/DIG. 42, 116/70; 200/83 Q; 210/85, 90

[56] References Cited

U.S. PATENT DOCUMENTS

| 3,323,648 | 6/1967 | Rosaen ................................. 210/90 |
| 3,944,969 | 3/1976 | Arai et al. . |
| 3,970,104 | 7/1976 | Decker et al. ..................... 116/70 X |
| 4,184,146 | 1/1980 | Fratzke et al. . |
| 4,216,524 | 8/1980 | Leveraus . |

Primary Examiner—James J. Gill

[57] ABSTRACT

A fluid filter monitoring system includes a filter relief valve movable in response to a pressure buildup caused by filter clogging to sequentially actuate a pair of pressure-operated switches. A temperature sensor senses the temperature of fluid in the hydraulic system. A control unit, including a microprocessor, controls the energization of a plurality of indicators, depending upon the status of the temperature sensor, the pressure-operated switches and the duration of actuation of the switches.

4 Claims, 4 Drawing Figures

FILTER MONITORING SYSTEM

BACKGROUND OF THE INVENTION

The present invention relates to a system for monitoring the status of a filter in a hydraulic circuit.

It is now possible, due to microprocessor technology, to monitor various vehicle operating parameters according to complex criteria. For example, a transmission oil pressure monitoring system is described in U.S. patent application Ser. No. 379,230 filed May 17, 1982, a clutch monitoring system is described in U.S. patent application Ser. No. 379,231 filed May 17, 1982, and an engine oil pressure monitoring system is described in U.S. patent application Ser. No. 378,704 filed May 17, 1982, all assigned to the assignee of the present invention. However, none of these monitoring systems provide an indication of the status of a filter in a hydraulic circuit, such as the hydraulic circuits of a hydraulically controlled and lubricated vehicle transmission.

It is known to monitor the condition of a fluid filter by means of a switch which is opened or closed, depending upon the condition of the filter, as described in U.S. Pat. No. 4,216,524. Another filter monitoring system described in U.S. Pat. No. 4,184,146 includes a single pressure-responsive filter switch connected in parallel with an oil temperature-operated switch so that no filter warning signal can be generated when the oil is cold. Also, an RC circuit prevents momentary operation of the filter switch from producing a warning signal. These filter monitoring systems are responsive only to a single level of filter restriction since each system includes only a single filter actuated switch. However, it is well known that the condition of a fluid filter (i.e., its degree of restriction) normally changes only gradually during its service life. Thus, when a filter monitoring system is responsive to only a single level of filter restriction, certain drawbacks exist. For example, such single level systems give no information as to the rate of change of the filter condition, thus giving no indication as to whether the filter restriction is due to normal service buildup or whether it is due to a catastrophic failure of some kind. Furthermore, if the switch actuating level of restriction is set too high, then a situation might occur wherein only a short time interval would elapse between warning signal generation and filter bypassing. If such a situation would occur out in the field where no replacement filter is immediately available, then loss of time and inconvenience would result from shutting the vehicle down while a replacement filter is obtained. Also in this situation, the operator might be tempted to risk serious machine damage by operating the machine after the filter warning is generated when no replacement filter is immediately available. On the other hand, if the switch actuating level of filter restriction is set too low, then the operator might misjudge the seriousness of the condition, thereby delaying filter replacement and risking serious machine damage.

SUMMARY OF THE INVENTION

An object of the present invention is to provide a fluid filter monitoring system which is responsive to a plurality of levels of filter restriction.

Another object of the present invention is to provide a filter monitoring system which gives an indication of the rate of change of the filter condition.

Another object of the present invention is to provide such a filter monitoring system wherein misleading warning signals, due to fluid temperature and momentary fluctuations, are prevented.

These and other objects are achieved by the present monitoring system which includes an oil filter relief valve which is movable to sequentially expose a pair of pressure-operated switches to fluid pressure in response to increasing levels of restriction in an oil filter. The monitoring system also includes an oil temperature sensor. A microprocessor implemented control algorithm actuates certain warning devices depending upon the status of the switches and the oil temperature. Warning signals are prevented when the oil is cold or when the switches are only momentarily closed.

DETAILED DESCRIPTION

Figure 1:
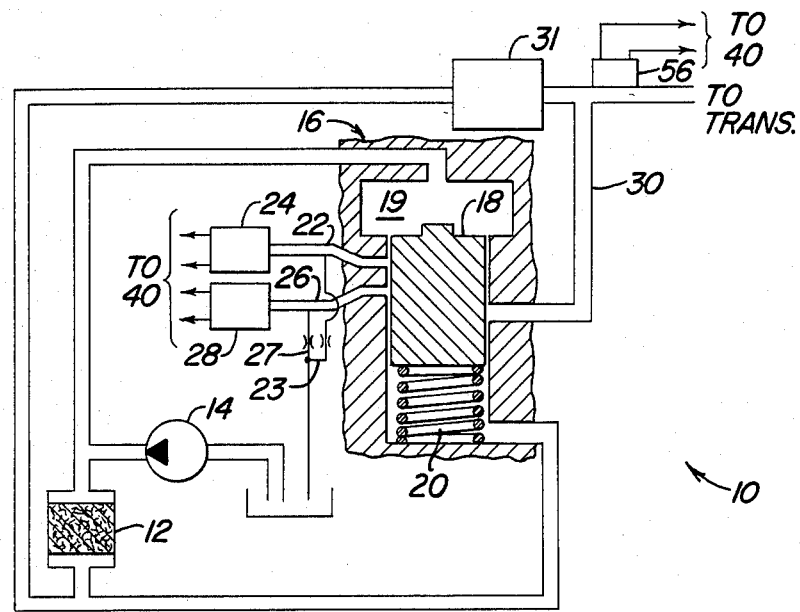
FIG. 1 is a schematic of a portion of a hydraulic circuit including a filter and a filter relief or bypass valve adapted for use in the present invention.
Figure 2:
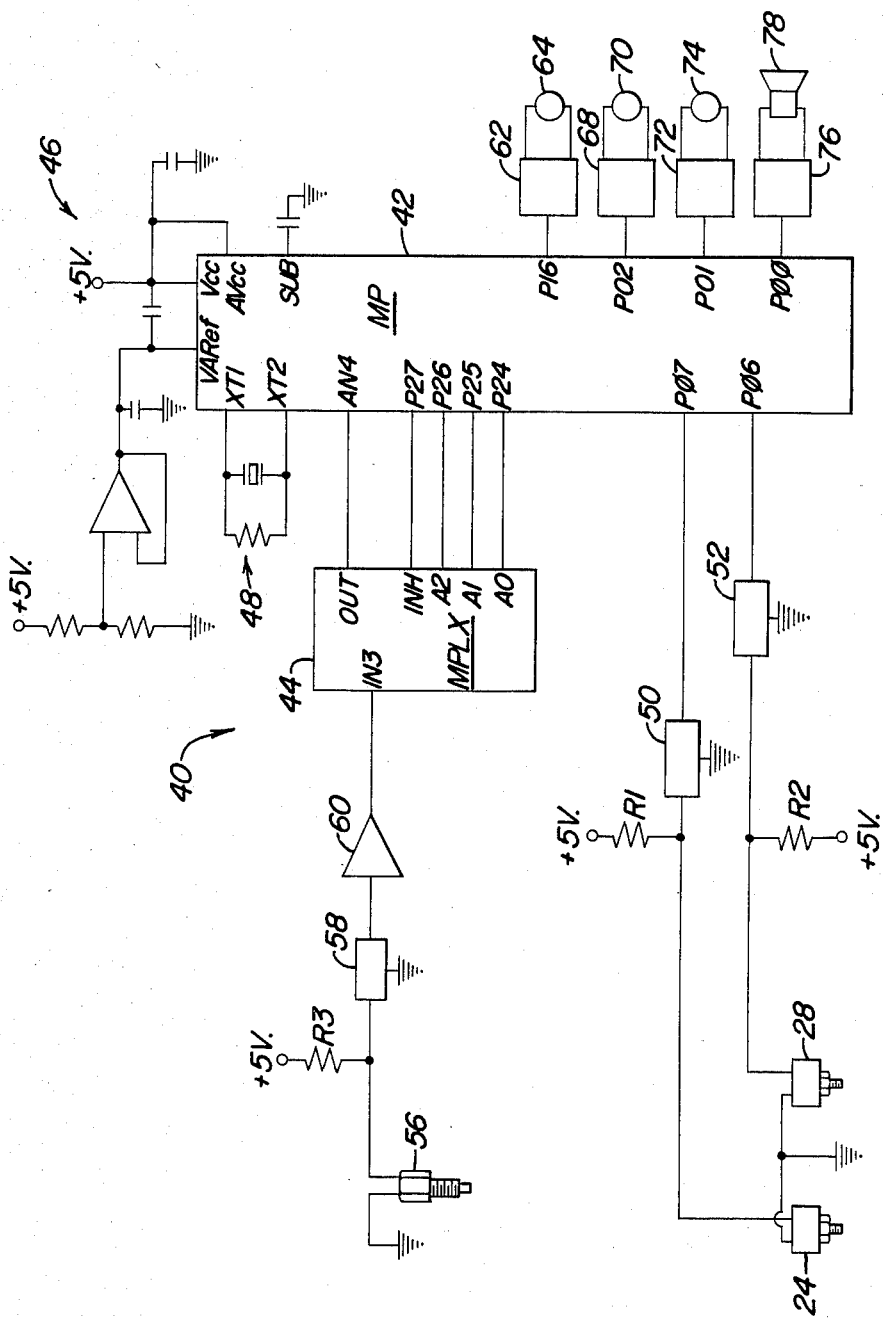
FIG. 2 is a circuit schematic diagram of a monitoring system for implementing the present invention.

An agricultural vehicle, such as a tractor, not shown, includes a hydraulically operated or hydraulic assist-type transmission (not shown) connected to a hydraulic circuit 10 which includes a filter 12 for filtering fluid flow from the pump 14 to the transmission. An oil filter relief valve 16 includes a spring-biased valve member 18 which moves to compress the spring 20 as the differential pressure across the filter 12 increases due to increases in the amount of restriction in the filter 12. Thus, at a first or lower level of restriction, the valve member 18 will move to uncover passage 22 to chamber 19 and expose first normally open pressure-operated switch 24 to high pressure fluid. At a second or higher level of filter restriction, the valve member 18 moves to uncover an additional passage 26 to chamber 19 and thus, expose a corresponding second normally open pressure-operated switch 28 to high pressure fluid. Thus, the status of switches 24 and 28 gives an indication of the degree of restriction of the filter 12. Bleed passages 23 and 27 prevent leakage from chamber 19 from operating switches 24 and 28. Alternatively, bleed passages could be provided in the surface of valve element 18. Further restriction in the filter 12 moves valve member 18 downward so that fluid can flow to the transmission for lubrication via filter bypass passage 30. The line to the transmission may also include an oil cooler 31.

A monitoring circuit 40 includes a conventional microprocessor 42, such as Intels' 8022 A/D Converter and Microprocessor, coupled to a conventional 8-to-1 analog multiplexer 44, such as is available from National Semiconductor or Motorola. A regulating circuit 46 provides a regulated 4-volt reference voltage to the VARef input of the micro 42 for use as a reference voltage in its internal A/D converter. A crystal circuit 48 provides a 3.6 MHz clock signal for the micro 42. Microprocessor terminals P24–P27 are connected to corresponding address terminals of the multiplexer 44.

Filter switch 24 includes a grounded terminal and a normally ungrounded terminal coupled to +5 volts via pull-up resistor R1 and to an input of the micro 42 via an electromagnetic interference (EMI) filter 50. Filter switch 28 also includes a grounded terminal and a normally ungrounded terminal coupled to +5 volts via pull-up resistor R2 and coupled to another input of the micro 42 via EMI filter 52.

Monitor circuit 40 also includes a hydraulic oil temperature sensor 56, such as a conventional resistance-type temperature sensor, which is positioned in any suitable location in the hydraulic circuit 10 of the hydraulic assist transmission, for example, in a line between the cooler 31 and the transmission components to be lubricated, (not shown), or immediately downstream of pump 14. The sensor 56 is coupled to +5 volts via pull-up resistor R3 and to an input IN3 of multiplexer 44 via EMI filter 58 and signal amplifier 60.

Output P16 of the micro 42 is coupled to a lamp driver 62 which drives a "transmission filter" lamp or other type indicating device 64 which is preferably mounted in a suitable position in the tractor cab. Similarly, output P02 is coupled to lamp driver 68 and "stop engine" light 70, and output P01 is coupled to driver 72 and "warning light" 74. Finally, output P00 is coupled to driver 76 which drives a horn 78.

Figure 3A:
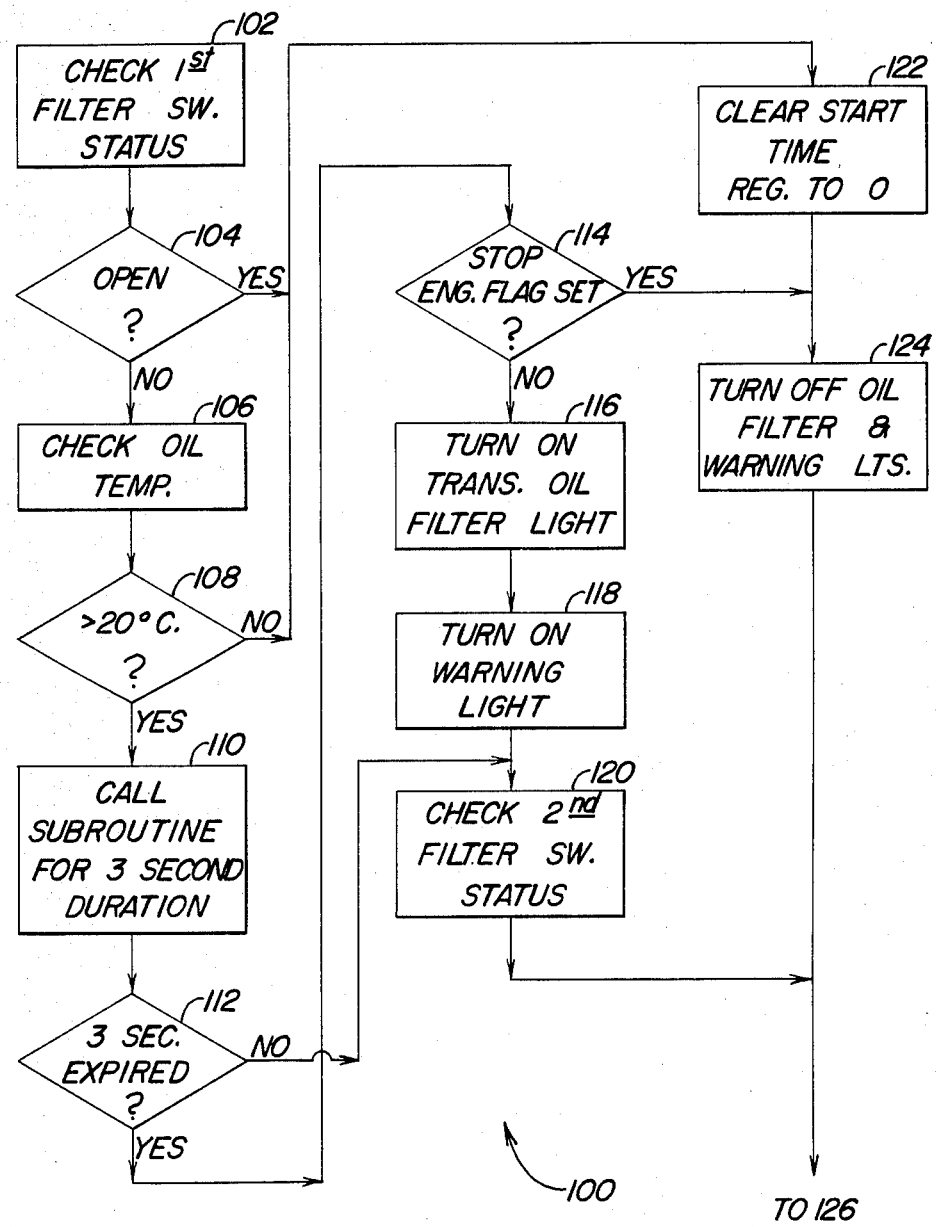
FIGS. 3a and 3b are flow charts illustrating the operational program contained in the microprocessor of the present invention.
Figure 3B:
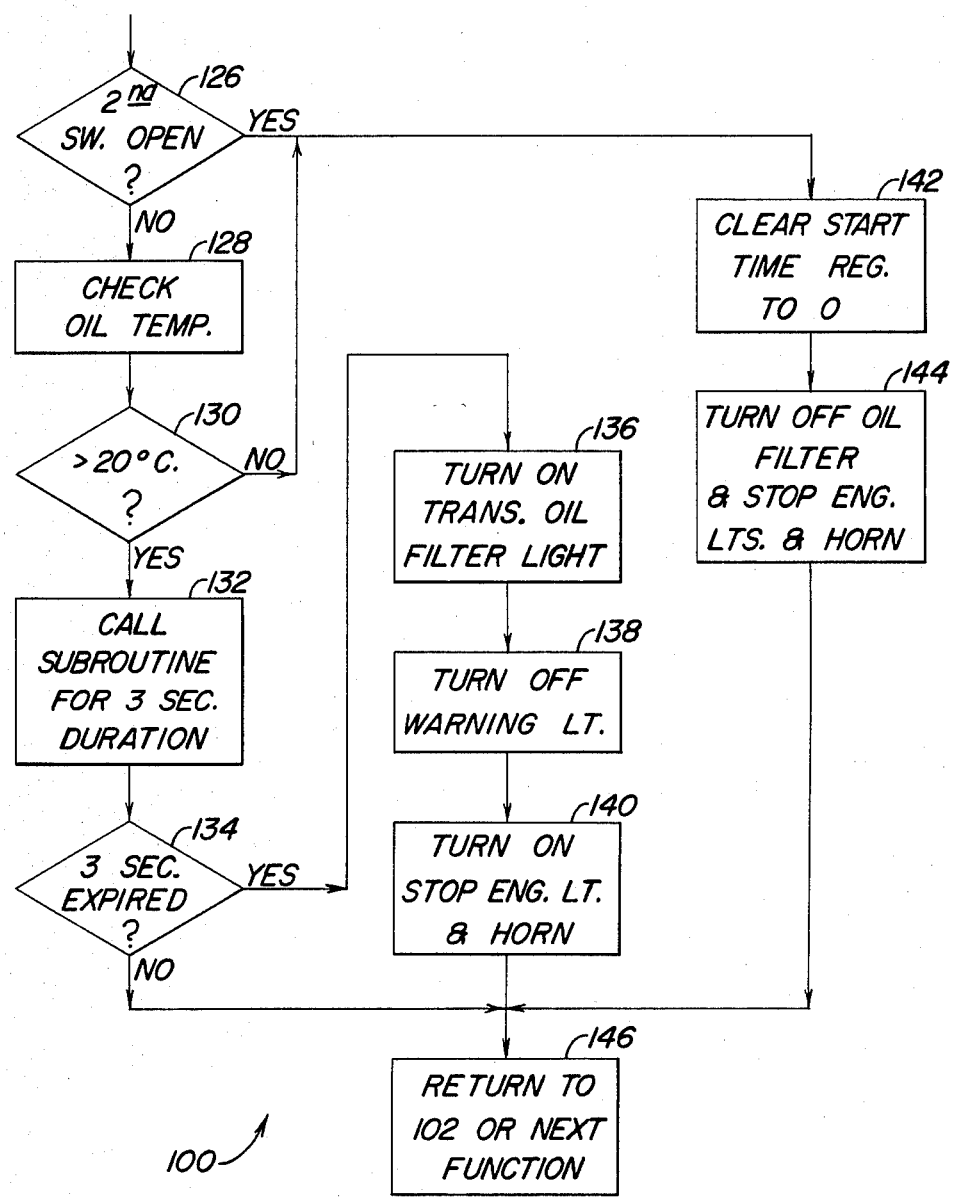

The applicants' monitoring system performs a monitoring function by carrying out an operational program or algorithm 100 which is contained in the memory of the micro 42. This operational algorithm will now be described with reference to the flow charts shown in FIGS. 3a and 3b.

The algorithm 100 begins at step 102 where the status of the first filter switch 24 is examined, whereupon step 104 directs the algorithm to steps 122 and 124 if switch 24 is open, as would be the case if there were no restriction in filter 12. In step 122, a duration start time register (not shown) is reset or cleared to 0 so that when a failure condition occurs, a duration subroutine entered via step 110 prevents generation of warning signals unless the failure condition persists for a certain time period. After step 122, instructions are generated to turn off the oil filter light 64 and the warning light 74. If the switch 24 is closed, then step 104 directs the algorithm to step 106. In step 106, the oil temperature data is obtained from the temperature sensor 56. Then, step 108 directs the algorithm to previously described steps 122 and 124 if the sensed temperature is not greater than a threshold level of 20 degrees centigrade, else the algorithm proceeds directly to step 110. Step 110 calls a duration subroutine which prevents generation of warning signals unless the failure condition persists continuously for a certain time period. The duration subroutine is described in detail in copending U.S. patent application Ser. No. 379,230 filed May 17, 1982, which is incorporated by reference herein. Briefly, the duration subroutine sets a flag value to zero if the desired duration period, in this case, 3 seconds, has not expired. If the duration period has expired, then the duration subroutine sets the flag value to FFH, which is a hexidecimal term meaning all binary 1 values. Thus, the value of the flag gives an indication to the main algorithm of whether or not the duration period has expired.

Step 112 sends the algorithm to step 120 if the 3 second duration period has not expired; otherwise, the algorithm proceeds to step 114, wherein a "stop engine flag" is examined to determine if a stop engine warning signal was generated by some other monitoring function which may be performed by the microprocessor 42. If no such stop engine warning signal has been generated, the algorithm proceeds to step 116; otherwise, it proceeds to step 124.

In steps 116 and 118, instructions are generated to turn on the transmission oil filter light 64 and the warning light 74, with the horn 78 and the stop engine light 70 remaining de-energized.

Then, in step 120, the status of the second filter switch 28 is examined. After steps 120 or 124, the routine proceeds to step 126 which directs the algorithm to steps 142 and 144 if the filter switch 28 is open. In step 142, the start time register is cleared to 0, as in step 122. Then, in step 144, the filter light 64, the stop engine light 70 and the horn 78 are turned off. Note that the warning light 74 will not be affected by step 144 if it were turned on prior to step 144. After step 144, the algorithm proceeds to step 146. If the filter switch 28 is closed (indicating a clogged filter condition), then step 126 directs the algorithm to step 128.

The oil temperature from sensor 56 is obtained in step 128, whereupon step 126 directs the algorithm to previously described steps 142 and 144 if the sensed temperature is not greater than 20 degrees celsius. Otherwise, the algorithm proceeds to step 132, wherein the previously described duration subroutine is called. Then, if the 3 second duration period has expired, step 134 directs the algorithm to steps 136, 138 and 140, otherwise, the algorithm proceeds to step 146.

In step 136, the filter light 64 is turned on. Then, in step 138, the warning light 74 is turned off and in step 140, the stop engine light 70 and the horn 78 are turned on. Finally, step 146 directs the algorithm to return to step 102, or to some other monitoring algorithm, if desired.

Thus, this warning system alerts the operator to high transmission oil filter restriction sensed by the pressure switches 24 and 28. When the first switch 24 closes for longer than approximately 3 seconds, the filter light 64 and the warning light 74 are turned on. When the second switch 28 closes for greater than approximately 3 seconds, the warning light 74 is turned off while the filter light 64, the stop engine light 70 and the horn 78 are turned on. Because of steps 108 and 110, no signals are generated if the hydraulic oil temperature sensed by sensor 56 is not greater than 20 degrees centigrade. By being sensitive to a plurality of levels of filter restriction, the present system gives an indication of the rate of change of the filter condition and thus, an indication of whether the filter restriction is due to normal service or is due to a catastrophic failure in the machine. Furthermore, by having a two-level restriction sensing capability, this monitoring system permits the vehicle operator to make better informed decisions about maintenance, such as filter replacement.

The conversion of the above flow chart into a standard language for implementing the algorithm described by the flow chart in a digital data processor will be evident to those with ordinary skill in the art.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A system for monitoring the condition of a filter in a hydraulic circuit, comprising:

first and second pressure-responsive switches operable in response to first and second levels, respectivley, of restriction in the filter;

first and second indicators energizable to produce first and second sensibly dissimilar operator-detectable warning signals; and a monitor circuit coupled to the switches and to the indicators, the monitor circuit including means for energizing both indicators in response to operation of only one of the switches and for preventing energization of both indicators unless the one switch is operated continuously for a certain time period, the monitoring circuit also including means for energizing one of the indicators and de-energizing the other of the indicators in response to operation of the second switch and for preventing energization of the one indicator unless the second switch is operated continuously for a predetermined time period.

2. The monitoring system of claim 1, further comprising:

a filter relief valve operable in response to differential fluid pressure across the filter to sequentially expose the first and second pressure-responsive switches to fluid pressure upstream of the filter.

3. The monitoring system of claim 2, wherein:

the filter relief valve is operable to open a filter bypass passage when both pressure-responsive switches are exposed to fluid pressure upstream of the filter.

4. A system for monitoring the condition of a filter in a hydraulic circuit, comprising:

first and second pressure-responsive switches operable in response to first and second levels, respectively, of restriction in the filter;

a first indicator energizable to produce a first operator-detectable warning signal;

a second indicator energizable to create a second operator-detectable warning signal which is sensibly dissimilar from the first warning signal;

a temperature sensor for sensing the temperature of fluid in the hydraulic circuit; and a monitoring circuit coupled to the switches, the indicators and the temperature sensor, the monitoring circuit including means for energizing both indicators in response to operation of only the first switch and for preventing energization of both indicators unless the sensed temperature is greater than a threshold level concurrently with the first switch being operated continuously for a certain time period, the monitor circuit also including means for energizing one of the indicators and de-energizing the other of the indicators in response to operation of the second switch and for preventing energization of both indicators unless the sensed temperature is greater than the threshold level concurrently with the second switch being operated continuously for a predetermined time period.

* * * * *

UNITED STATES PATENT AND TRADEMARK OFFICE
CERTIFICATE OF CORRECTION

PATENT NO. : 4,500,874

DATED : February 19, 1985

INVENTOR(S) : Stephen F. Jacobi et al.

It is certified that error appears in the above-identified patent and that said Letters Patent is hereby corrected as shown below:

Column 5, lines 2 and 3, "respectivley" should read -- respectively --.

Signed and Sealed this

Seventh Day of January 1986

[SEAL]

Attest:

DONALD J. QUIGG

Attesting Officer

Commissioner of Patents and Trademarks